(12) United States Patent
Hongo et al.

(10) Patent No.: US 9,341,749 B2
(45) Date of Patent: May 17, 2016

(54) WINDOW FOR DISPLAY DEVICE AND DISPLAY DEVICE INCLUDING THE WINDOW

(71) Applicant: SAMSUNG DISPLAY CO., LTD., Yongin, Gyeonggi-Do (KR)

(72) Inventors: Yuki Hongo, Yongin (KR); Ju-Suk Oh, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 116 days.

(21) Appl. No.: 14/053,939

(22) Filed: Oct. 15, 2013

(65) Prior Publication Data

US 2014/0300970 A1    Oct. 9, 2014

(30) Foreign Application Priority Data

Apr. 5, 2013  (KR) .................. 10-2013-0037609

(51) Int. Cl.
*G02B 1/111*    (2015.01)
(52) U.S. Cl.
CPC ....................................... *G02B 1/111* (2013.01)
(58) Field of Classification Search
CPC ........ H04N 5/65; G01B 1/111; G06F 1/1609; G06F 1/1603; H01J 29/896

USPC ............. 359/609, 894; 428/473.5, 474.4, 421
See application file for complete search history.

(56) References Cited

U.S. PATENT DOCUMENTS

2009/0135343 A1*  5/2009  Kitamura ............. G02B 5/3033
                                                        349/96

FOREIGN PATENT DOCUMENTS

| JP | 2010-204622 A | 9/2010 |
|---|---|---|
| KR | 10-2007-0077071 A | 7/2007 |
| KR | 10-2008-0028113 A | 3/2008 |
| KR | 10-2011-0068060 A | 6/2011 |
| KR | 10-2012-0015184 A | 2/2012 |

* cited by examiner

*Primary Examiner* — Mohammed Hasan
*Assistant Examiner* — Rahman Abdur
(74) *Attorney, Agent, or Firm* — Lee & Morse, P.C.

(57) ABSTRACT

A window for a display device and a display device, the window including a first plastic substrate; a second plastic substrate on one side of the first plastic substrate, the second plastic substrate including a cycloolefin polymer; and a third plastic substrate on one side of the second plastic substrate, wherein a refractive index difference between the first plastic substrate and the second plastic substrate is less than or equal to about 0.05.

16 Claims, 2 Drawing Sheets

WINDOW FOR DISPLAY DEVICE AND DISPLAY DEVICE INCLUDING THE WINDOW

CROSS-REFERENCE TO RELATED APPLICATION

Korean Patent Application No. 10-2013-0037609 filed on Apr. 5, 2013, in the
Korean Intellectual Property Office, and entitled: "WINDOW FOR DISPLAY DEVICE AND DISPLAY DEVICE INCLUDING THE WINDOW," is incorporated by reference herein in its entirety.

BACKGROUND

1. Field
Embodiments relate to a window for a display device and a display device including the same.
2. Description of the Related Art
Display devices may include a liquid crystal display (LCD), a plasma display panel (PDP), an organic light emitting diode display (OLED), a field emission display (FED), an electrophoretic display device, or the like.

SUMMARY

Embodiments are directed to a window for a display device and a display device including the same.

The embodiments may be realized by providing a window for a display device including a first plastic substrate; a second plastic substrate on one side of the first plastic substrate, the second plastic substrate including a cycloolefin polymer; and a third plastic substrate on one side of the second plastic substrate, wherein a refractive index difference between the first plastic substrate and the second plastic substrate is less than or equal to about 0.05.

A refractive index difference between the second plastic substrate and the third plastic substrate may be less than or equal to about 0.05.

The second plastic substrate may have a thickness of about 50 μm to about 150 μm.

The first plastic substrate may include a polycarbonate, a polycarbonate-polymethylmethacrylate polymer alloy, a cycloolefin polymer, a copolymer thereof, or a combination thereof.

The third plastic substrate may include an ultraviolet curable resin.

The third plastic substrate may include an acryl-based compound, an epoxy-based compound, or a combination thereof.

The first plastic substrate may have a thickness of about 400 μm to about 800 μm.

The third plastic substrate may have a thickness of about 5 μm to about 150 μm.

The window for a display device may further include a binder layer between the first plastic substrate and the second plastic substrate.

A refractive index difference between the binder layer and the first plastic substrate, and a refractive index difference between the binder layer and the second plastic substrate may each be less than or equal to about 0.05.

The binder layer may have a thickness of about 5 μm to about 15 μm.

A material for forming the binder layer may include a polyester-based compound, an acryl-based compound, or a combination thereof.

The first plastic substrate and the second plastic substrate may contact each other.

The window for a display device may have a thickness of less than or equal to about 1 mm.

The window for a display device may be obtained by injection molding in a film insert manner.

The third plastic substrate may include a filler, the filler including silica, alumina, mica, a glass bead, titania, iron oxide, or a combination thereof.

The embodiments may also be realized by providing a display device including the window for a display device according to an embodiment

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
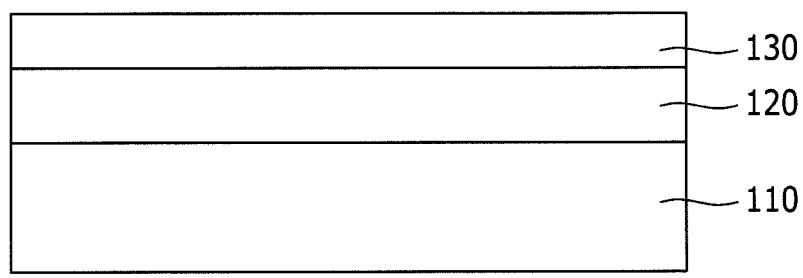
FIG. 1 illustrates a cross-sectional view showing a window for a display device according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, it will also be understood that when a layer is referred to as being "between" two layers, it can be the only layer between the two layers, or one or more intervening layers may also be present.

Figure 2:
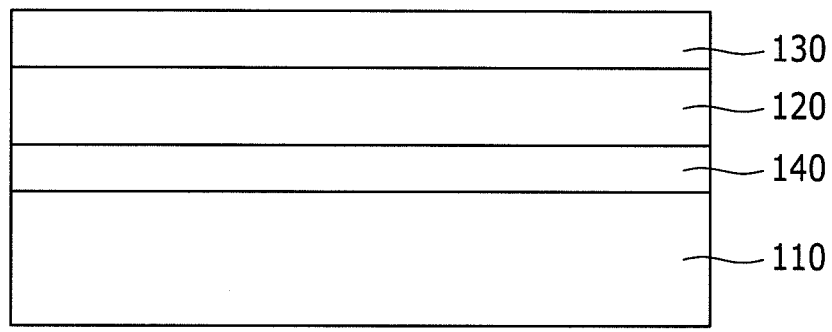
FIG. 2 illustrates a cross-sectional view showing a window for a display device according to one embodiment.

Referring to FIGS. 1 and 2, a window for a display device in accordance with embodiments is described. FIG. 1 illustrates a cross-sectional view showing the window for a display device according to one embodiment. FIG. 2 illustrates a cross-sectional view showing the window for a display device according to one embodiment.

Referring to FIG. 1, the window for a display device 100 according to one embodiment may include a first plastic substrate 110, a second plastic substrate 120 on one side of the first plastic substrate 110, and a third plastic substrate 130 on one side of the second plastic substrate 120. In an implementation, the second plastic substrate 120 may include a cycloolefin polymer (COP). In an implementation, the second plastic substrate 120 may be between the first plastic substrate 110 and the third plastic substrate 130. In an implementation, the first plastic substrate 110, the second plastic substrate 120, and the third plastic substrate 130 may be different from one another, e.g., may be formed of different materials.

The first plastic substrate 110 may be made of an injection moldable polymer resin, e.g., may include a polycarbonate (PC), a polycarbonate-polymethylmethacrylate (PC-PMMA) polymer alloy, a cycloolefin polymer (COP), a copolymer thereof, or a combination thereof. Herein, the 'combination' may refer to a blend or a stack of two or more.

The first plastic substrate 110 may have a thickness of about 400 µm to about 800 µm. When the first plastic substrate 110 has a thickness within the range, the first plastic substrate 110 may be manufactured into a thin film and may sufficiently protect the display panel.

As noted above, the second plastic substrate 120 may include a cycloolefin polymer (COP).

The cycloolefin polymer (COP) may have relatively high hardness of transparent polymers. The second plastic substrate 120 may help decrease flexure or flexibility of the window for a display device 100 due to including the cycloolefin polymer (COP).

The cycloolefin polymer (COP) may have a refractive index of about 1.50 to about 1.56. The refractive index may be measured by using an Abbe refractometer (ATAGO Inc., DR-M2) at a Na lamp light source ($\lambda$=589.3 nm).

When the second plastic substrate 120 includes a cycloolefin polymer (COP) having a refractive index within the above range, the second plastic substrate 120 may minimize a refractive index difference with respect to the first plastic substrate 110 and a refractive index difference with respect to the third plastic substrate 130 (that will be described below) within a predetermined range. Accordingly, the window for a display device 100 may help minimize undesirable discoloration of reflected light on the surface thereof, and may help ensure high quality appearance of the window for a display device.

The second plastic substrate 120 may have a thickness of about 50 µm to about 150 µm. Within the above thickness range, the window for a display device 100 may be manufactured into a thin film while helping to ensure impact resistance.

A refractive index difference between the first plastic substrate 110 and the second plastic substrate 120 may be less than or equal to about 0.05. Herein, the refractive index difference indicates an absolute value.

When the refractive index difference between the first plastic substrate 110 and the second plastic substrate 120 is less than or equal to about 0.05, interface reflection between the first plastic substrate 110 and second plastic substrate 120 may be suppressed, and appearance characteristic of the window for a display device 100 may be improved.

In an implementation, the refractive index difference of the first plastic substrate 110 and the second plastic substrate 120 may be less than or equal to about 0.04, e.g., less than or equal to about 0.03, less than or equal to about 0.02, or less than or equal to about 0.01.

As the refractive index difference becomes smaller, properties may be improved. For example, when the refractive index difference is about 0, the first plastic substrate 110 and the second plastic substrate 120 may have no interface reflection. In an implementation, when the first plastic substrate 110 includes a cycloolefin polymer (COP), the first plastic substrate 110 may have a substantially same refractive index as the second plastic substrate 120.

As described above, the third plastic substrate 130 may be on one side of the second plastic substrate 120 and may have a refractive index difference of less than or equal to about 0.05 with respect to the second plastic substrate 120.

When the third plastic substrate 130 has the refractive index difference of less than or equal to about 0.05 with respect to the second plastic substrate 120, interface reflection between the third and second plastic substrates 130 and 120 may be suppressed. Thus, appearance characteristic of the window for a display device 100 may be improved.

In an implementation, the third plastic substrate 130 may have a refractive index difference of less than or equal to about 0.04, e.g., less than or equal to about 0.03, less than or equal to about 0.02, or less than or equal to about 0.01, with respect to the second plastic substrate 120. As noted above, when the refractive index difference decreases, properties may be improved. For example, when the refractive index difference is 0, the second plastic substrate 120 and the third plastic substrate 130 may have no interface reflection.

The third plastic substrate 130 may include an ultraviolet (UV) curable resin.

The third plastic substrate 130 may further include a photopolymerization initiator along with the ultraviolet (UV) curable resin. The photopolymerization initiator may include, e.g., an acetophenone-based compound or a benzophenone-based compound, but is not limited thereto.

In an implementation, the third plastic substrate 130 may include an acryl-based compound, an epoxy-based compound, or a combination thereof. In an implementation, the acryl-based compound may be preferable in terms of transparency and surface hardness.

In an implementation, the third plastic substrate 130 may further include a filler. The filler may include, e.g., silica, alumina, mica, a glass bead, titania, iron oxide, or a combination thereof. In an implementation, the filler may include silica, in view of light transmittance among the aforementioned materials.

The third plastic substrate 130 may have a thickness of about 5 µm to 150 µm. When the third plastic substrate 130 has a thickness within the range, the window for a display device 100 may be thin and may simultaneously have an appropriate surface hardness.

Referring to FIG. 2, a binder layer 140 may be included between the first plastic substrate 110 and the second plastic substrate 120. A material for the binder layer is not limited, and may include a suitable one that adheres the first plastic substrate 110 to the second plastic substrate 130. In an implementation, the material for the binder layer may include, e.g., a polyester-based compound, an acryl-based compound, or a combination thereof.

When the binder layer 140 is between the first plastic substrate 110 and the second plastic substrate 120, a refractive index difference between the binder layer 140 and the first plastic substrate 110, and a refractive index difference between the binder layer 140 and the second plastic substrate 120 may be less than or equal to about 0.05, respectively. Within the above range of the refractive index difference, the window for a display device 100 may ensure aesthetic quality.

The binder layer 140 may have, e.g., a thickness of about 5 µm to about 15 µm.

In an implementation, the binder layer 140 may be omitted, as desired. For example, the binder may not be disposed between the first plastic substrate 110 and the second plastic substrate 120, and the first plastic substrate 110 and the second plastic substrate 120 may contact each other.

The window for a display device 100 may be obtained by injection molding in a film insert manner. The window for a display device 100 may have, e.g., a thickness of less than or equal to about 1 mm.

The window for a display device 100 may have a surface haze of less than about 1.0%. The haze may be measured using a hazemeter (NDH-5000, Nippondenshoku Industries Co. Ltd.). When the haze is within the range, desired visibility may be provided.

The above-described window panel may be applied for various display devices. The display device may include, e.g., a liquid crystal display (LCD), an organic light emitting diode (OLED) display, a plasma display, an electric field effect display device, an electrophoresis display device, or the like, but is not limited thereto.

The window for a display device may be disposed on a display module. The display module may include, e.g., a liquid crystal display module, an organic light emitting display module, a plasma display module, an electric field effect display module, an electrophoresis display module, or the like.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Window for Display Device

Example 1

One side of a COP film (ZeonorFilmZF14, Nippon ZEON) was corona-treated, and an ultraviolet (UV) curable acrylic resin was coated thereon, dried, and cured by radiating UV rays. The other side of the COP film was corona-treated, and an acrylic binder solution was coated thereon and dried at 100° C. for 10 minutes to form a binder layer. Then, the COP film was put in an injection molder to injection-mold a COP resin to manufacture a window for a display device having a total thickness of 710 μm.

The characteristics of window for a display device are shown in the following Table 1.

TABLE 1

|  | Refractive index | Thickness (μm) |
| --- | --- | --- |
| First plastic substrate (COP resin) | 1.53 | 500 |
| Binder layer (acrylic binder solution) | 1.50 | 10 |
| Second plastic substrate (COP film) | 1.53 | 100 |
| Third plastic substrate (acrylic resin) | 1.52 | 100 |

Herein, the reflective index was measured by using an Abbe refractometer (DR-M2, ATAGO Inc.).

Example 2

A window for a display device having a total thickness of 700 μm was manufactured according to the same method as Example 1 except for omitting the binder layer.

Comparative Example 1

An ultraviolet (UV) curable acrylic resin was coated on one side of a PET film (A4300, TOYOBO Cosmo Shine), dried, and cured by radiating UV rays. The other side of the PET film was coated with an acrylic binder solution and dried at 100° C. for 10 minutes to form a binder layer. Then, the PET film was put in an injection molder to injection-mold a polycarbonate (PC) resin, manufacturing a window for a display device having a total thickness of 710 μm.

The characteristics of the window for a display device are shown in the following Table 2.

TABLE 2

|  | Refractive index | Thickness (μm) |
| --- | --- | --- |
| First plastic substrate (PC resin) | 1.58 | 500 |
| Binder layer (acrylic binder solution) | 1.50 | 10 |
| Second plastic substrate (PET film) | 1.65 | 100 |
| Third plastic substrate (acrylic resin) | 1.52 | 100 |

Herein, the reflective index was measured by using an Abbe refractometer (DR-M2, ATAGO Inc.).

Evaluation

The windows for a display device according to Examples 1 and 2 and Comparative Example 1 were evaluated about appearance, impact resistance, and surface hardness.

Evaluation 1: Appearance Evaluation of Window for Display Device

The first plastic substrates of the windows for a display device according to Examples 1 and 2 and Comparative Example 1 were painted with a black organic pen, and reflected light was examined with naked eyes under a three-wavelength fluorescent lamp. Distances between the fluorescent lamp and the windows were 1 m, respectively.

The appearance of the windows was evaluated and compared with a soda glass (having a refractive index of 1.51) as follows.

O: the reflected light of a window was the same as that of the soda glass

X: the reflected light of a window was discolored

Evaluation 2: Surface Hardness Evaluation of Window for Display Device

Surface hardness of the windows for a display device was measured by loading 1 kg and using a pencil hardness tester (BMS Tech).

Evaluation 3: Impact Resistance Evaluation of Window for Display Device

Impact resistance was measured by dropping a metal weight of 130 g in the center of the windows for a display device with a Ball Drop measurement device and measuring a maximum height at which the windows for a display device had no crack.

The results are shown in Table 3, below.

TABLE 3

|  | Appearance | Surface hardness | Impact resistance |
| --- | --- | --- | --- |
| Example 1 | O | 8H | 80 cm |
| Example 2 | O | 8H | 90 cm |
| Comparative Example 1 | X | 8H | 80 cm |

Referring to Table 3, the windows for a display device according to Examples 1 and 2 showed a reflected light color equivalent to that of a soda glass, while the window for a display device according to Comparative Example 1 showed a discolored reflected light. The results indicate that the windows for a display device according to Examples 1 and 2 had high quality appearance, equivalent to that of the soda glass window.

The windows for a display device according to Examples 1 and 2 exhibited surface hardness and impact resistance equivalent to those of the window for a display device according to Comparative Example 1.

Thus, the windows for a display device according to Examples 1 and 2 had satisfactory surface hardness and impact resistance as well as good appearance characteristics.

The window for a display device according to an embodiment may provide good impact resistance as well as satisfactory appearance.

By way of summation and review, display devices may include a display module displaying an image and a window panel protecting the display module. The window panel may be fabricated by using a single plastic substrate or more than two kinds of plastic substrates. However, the window formed of more than two kinds of plastic substrates may have an appearance defect due to different characteristics of the substrates.

The embodiments provide a window for a display device that helps ensure high quality of appearance even when more than two kinds of plastic substrates are adhered together.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A window for a display device, comprising a first plastic substrate;
    a second plastic substrate on one side of the first plastic substrate, the second plastic substrate including a cycloolefin polymer; and
    a third plastic substrate on one side of the second plastic substrate, the third plastic substrate having a thickness of about 5 μm to about 150 μm,
    wherein:
        a refractive index difference between the first plastic substrate and the second plastic substrate is less than or equal to about 0.05, and
        the third plastic substrate is on an outermost side of the window.

2. The window for a display device as claimed in claim 1, wherein a refractive index difference between the second plastic substrate and the third plastic substrate is less than or equal to about 0.05.

3. The window for a display device as claimed in claim 1, wherein the second plastic substrate has a thickness of about 50 μm to about 150 μm.

4. The window for a display device as claimed in claim 1, wherein the first plastic substrate includes a polycarbonate, a polycarbonate-polymethylmethacrylate polymer alloy, a cycloolefin polymer, a copolymer thereof, or a combination thereof.

5. The window for a display device as claimed in claim 1, wherein the third plastic substrate includes an ultraviolet curable resin.

6. The window for a display device as claimed in claim 5, wherein the third plastic substrate includes an acryl-based compound, an epoxy-based compound, or a combination thereof.

7. The window for a display device as claimed in claim 1, wherein the first plastic substrate has a thickness of about 400 μm to about 800 μm.

8. The window for a display device as claimed in claim 1, further comprising a binder layer between the first plastic substrate and the second plastic substrate.

9. The window for a display device as claimed in claim 8, wherein a refractive index difference between the binder layer and the first plastic substrate, and a refractive index difference between the binder layer and the second plastic substrate are each less than or equal to about 0.05.

10. The window for a display device as claimed in claim 8, wherein the binder layer has a thickness of about 5 μm to about 15 μm.

11. The window for a display device as claimed in claim 8, wherein a material for forming the binder layer includes a polyester-based compound, an acryl-based compound, or a combination thereof.

12. The window for a display device as claimed in claim 1, wherein the first plastic substrate and the second plastic substrate contact each other.

13. The window for a display device as claimed in claim 1, wherein the window for a display device has a thickness of less than or equal to about 1 mm.

14. The window for a display device as claimed in claim 1, wherein the window for a display device is obtained by injection molding in a film insert manner.

15. The window for a display device as claimed in claim 1, wherein the third plastic substrate includes a filler, the filler including silica, alumina, mica, a glass bead, titania, iron oxide, or a combination thereof.

16. A display device comprising the window for a display device as claimed in claim 1.

* * * * *